(12) United States Patent
Old

(10) Patent No.: US 10,713,013 B1
(45) Date of Patent: Jul. 14, 2020

(54) APPARATUS AND METHOD FOR AN EXPONENTIAL OPERATOR FOR A HALF-PRECISION FLOATING-POINT FORMAT

(71) Applicant: Xilinx, Inc., San Jose, CA (US)

(72) Inventor: Gordon I. Old, Edinburgh (GB)

(73) Assignee: XILINX, INC., San Jose, CA (US)

( * ) Notice: Subject to any disclaimer, the term of this patent is extended or adjusted under 35 U.S.C. 154(b) by 533 days.

(21) Appl. No.: 15/052,564

(22) Filed: Feb. 24, 2016

(51) Int. Cl.
*G06F 7/556* (2006.01)
*G06F 7/483* (2006.01)

(52) U.S. Cl.
CPC .............. *G06F 7/556* (2013.01); *G06F 7/483* (2013.01)

(58) Field of Classification Search
CPC ........ G06F 1/03; G06F 1/0307; G06F 1/0356; G06F 7/544; G06F 7/556; G06F 2101/08; G06F 2101/10; G06F 2101/12
USPC .................................. 708/270–272, 276–290
See application file for complete search history.

(56) References Cited

U.S. PATENT DOCUMENTS

| | | | | |
|---|---|---|---|---|
| 5,359,551 A * | 10/1994 | Pickett | ..................... | G06F 1/035 708/270 |
| 9,015,217 B2 * | 4/2015 | Arnold | ..................... | G06F 7/544 708/235 |
| 2007/0043799 A1 * | 2/2007 | Verma | .................... | G06F 1/0356 708/290 |
| 2009/0037504 A1 * | 2/2009 | Hussain | ................... | G06F 7/556 708/277 |
| 2010/0198894 A1 * | 8/2010 | Azadet | ..................... | G06F 1/035 708/209 |
| 2013/0054665 A1 * | 2/2013 | Felch | ..................... | G06F 1/0307 708/517 |
| 2014/0372493 A1 * | 12/2014 | Peterson | ................. | G06F 7/544 708/209 |
| 2016/0211862 A1 * | 7/2016 | Ho | .......................... | H03M 7/06 |

(Continued)

OTHER PUBLICATIONS

Claude Baumann, A Simple and fast look up table method to compute the exp(x) and ln(x) functions, 2004, http://www.confict.lu/Jeunes/ultimate_stuff/exp_In_2.htm.*

(Continued)

*Primary Examiner* — Andrew Caldwell
*Assistant Examiner* — Emily E Larocque
(74) *Attorney, Agent, or Firm* — Patterson + Sheridan, LLP

(57) ABSTRACT

An apparatus for an exponential function for a half-precision floating-point format for an exponent x includes a denormalizer for receiving sign, exponent and significand bits for conversion of significant bits to a fixed-point format for a signed fixed-point representation. A splicer receives the signed fixed-point representation to output first, second and third splices. A first lookup table receives the first splice for accessing a floating-point exponent and a floating-point mantissa. A second lookup table receives the second splice for accessing a fixed-point exponent value. A first multiplier receives the fixed-point exponent value and the third splice to provide a first multiplication result. An adder receives the fixed-point exponent value and the first multiplication result to provide a sum. A second multiplier receives the floating-point mantissa and the sum to provide a second multiplication result. A combination of the floating-point exponent and the second multiplication result is a floating-point value.

20 Claims, 8 Drawing Sheets

(56) References Cited

U.S. PATENT DOCUMENTS

2016/0224318 A1* 8/2016 Ho .......................... G06F 5/012

OTHER PUBLICATIONS

Matlab Central—how to implement exponential function and log in HDL coder, 2014, http://www.mathworks.com/matlabcentral/newsreader/view_thread/333341.*

A Tutorial on Data Representation: Integers, Floating-point Numbers, and Characters, https://www3.ntu.sg/home/ehchua/programming/java/Datarepresentation.html, cached Nov. 23, 2014.*

Florent De Dinechin, Bogdan Pasca. Floating-point exponential functions for DSP-enabled FP- GAs. International Conference on Field-Programmable Technology, Dec. 2010, IEEE, pp. 110-117, Beijing, China.

\* cited by examiner

US 10,713,013 B1

APPARATUS AND METHOD FOR AN EXPONENTIAL OPERATOR FOR A HALF-PRECISION FLOATING-POINT FORMAT

FIELD OF THE INVENTION

The following description relates to integrated circuit devices ("ICs"). More particularly, the following description relates to an exponential operator for a half-precision floating-point format for an IC.

BACKGROUND

In computer representation of numbers various representations may be used, including two's complement, integer, unsigned, single precision, double precision, and floating-point, among others. Moreover, there are combinations of these representations, such as single-precision floating-point and double-precision floating-point for example.

Floating-point is a format sometimes referred to as a scientific format, with a significand multiplied by a base to an exponent. For IEEE 754, three types of allowed floating-point formats are: single-precision floating-point (known as "float" in the C computer language ("C"), double-precision floating-point (known as "double" in C), and half-precision floating-point. In broad terms, differences between double, single, and half precisions are respective bit widths of their respective exponent and significand fields.

More recently, half-precision floating-point has been gaining acceptance in some data storage applications, namely in applications with a lower precision threshold in order to occupy less storage space in memory. Along those lines, for IEEE 754-2008, a 16-bit base 2 format ("binary16") is used for half-precision numbers. In comparison to some other binary formats, half-precision binary floating-point numbers use less storage and less bandwidth though with less precision and less range. However, half-precision floating-point formatted numbers have a larger dynamic range than comparable integer formatted numbers.

Hence, it is desirable and useful to provide circuitry for an exponential operator for a half-precision floating-point format.

SUMMARY

An apparatus relates generally to an exponential function of a form $e^x$ for an exponent x in a half-precision floating-point format for x a variable. In such an apparatus, a denormalizer circuit ("denormalizer") is configured to receive a sign bit, exponent bits and significand bits for the exponent x and to convert the significand bits to a fixed-point format to provide a signed fixed-point representation. A splicer circuit ("splicer") is coupled to the denormalizer circuit and configured to receive the signed fixed-point representation and output a first splice, a second splice, and a third splice from the signed fixed-point representation. A first lookup table memory is coupled to the splicer and configured to receive the first splice as a first address and to access a floating-point exponent and a floating-point mantissa associated therewith stored therein responsive to the first address. A second lookup table memory is coupled to the splicer and configured to receive the second splice as a second address and access a fixed-point exponent value responsive to the second address. A first multiplier is configured to receive the fixed-point exponent value and the third splice and provide a first multiplication result. An adder is configured to receive the fixed-point exponent value and the first multiplication result and provide a sum. A second multiplier is configured to receive the floating-point mantissa and the sum and provide a second multiplication result. A combination of the floating-point exponent and the second multiplication result is a floating-point value.

An apparatus relates generally to an exponential function of a form $e^x$ for an exponent x in a half-precision floating-point format for x a variable. In such an apparatus, a denormalizer circuit ("denormalizer") is configured to receive a sign bit, exponent bits and significand bits for the exponent x and convert the significand bits to a fixed-point format to provide a signed fixed-point representation. A splicer circuit ("splicer") is coupled to the denormalizer circuit and configured to receive the signed fixed-point representation and output a first splice, a second splice, and a third splice from the signed fixed-point representation. A first lookup table memory is coupled to the splicer circuit and configured to receive the first splice as a first address and access a floating-point exponent and a floating-point mantissa responsive to the first address. A second lookup table memory is coupled to the splicer circuit and configured to receive the second splice as a second address and access a first fixed-point value responsive to the second address. A third lookup table memory is coupled to the splicer and configured to receive the third splice as a third address and access a second fixed-point value responsive to the third address. A first multiplier is configured to receive the first fixed-point value and the second fixed-point value and provide a first multiplication result. A second multiplier is configured to receive the floating-point mantissa and the first multiplication result and provide a second multiplication result. A combination of the floating-point exponent and the second multiplication result is a floating-point value.

A method relates generally to an exponential function of a form $e^x$ for an exponent x in a half-precision floating-point format for x a variable. In such a method, obtained are a sign bit, exponent bits and significand bits for the exponent x by bit stripping the exponent x for input to a denormalizer circuit ("denormalizer"). The significand bits are converted to a fixed-point format with the denormalizer to provide a signed fixed-point representation responsive to the sign bit and the exponent bits. Output from a splicer circuit ("splicer") are a first splice, a second splice, and a third splice from the signed fixed-point representation. The first splice and the second splice are respectively received as a first address to a first lookup table memory and a second address to a second lookup table memory. Accessed from the first lookup table memory are a floating-point exponent and a floating-point mantissa responsive to the first address. Accessed from the second lookup table memory is a fixed-point value responsive to the second address. The fixed-point value and the third splice are multiplied by a first multiplier to provide a first multiplication result. The fixed-point value and the first multiplication result are added by an adder to provide a first sum. The floating-point mantissa and the first sum are multiplied by a second multiplier to provide a second multiplication result. The second multiplication result is normalized responsive to a most significant bit ("MSB") of the second multiplication result to provide a partial product output. The floating-point exponent and the MSB are added to provide a second sum.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 1-1 and 1-3 in combination is a block diagram depicting an exemplary exponential operator circuit, and FIGS. 1-2 and 1-3 in combination is a block diagram depicting another exemplary exponential operator circuit.

FIG. 2-2 is a schematic diagram depicting another digital signal processing circuit, such as may be used in the exemplary exponential operator circuit of FIG. 1-1 to replace the digital signal processing circuit thereof.

FIGS. 3-1 and 3-2 in combination is a flow diagram depicting an exemplary exponential function determination flow for an exponential function of a form $e^{\hat{}}x$ for an exponent x in a half-precision floating-point format for x a variable, such as previously described with reference to FIGS. 1-1 through 2-2.

DETAILED DESCRIPTION

Figure 1:
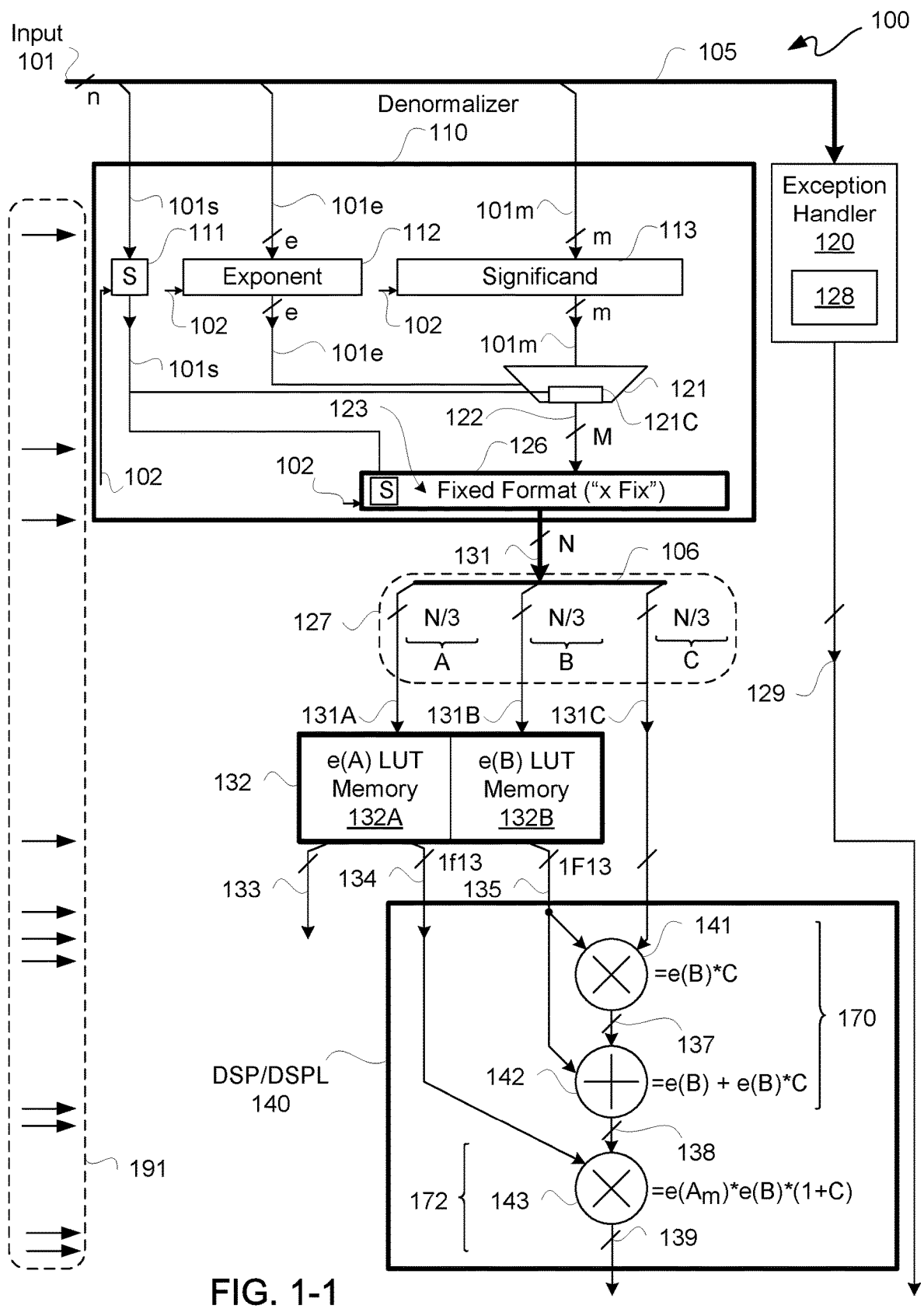
FIG. 2-1 is a schematic diagram depicting a digital signal processing circuit, such as may be used in the exemplary exponential operator circuit of FIG. 1-1 to replace the digital signal processing circuit thereof.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding. For purposes of clarity by way of example and not limitation, the following description is in terms of an IEEE 754 half-precision binary floating-point format.

Generally, floating-point numbers may be thought of as numbers in scientific notation, though in binary and with a sign bit, unless unsigned numbers are used. For binary, an exponent field and a significand field are each base-2 numbers. An IEEE 754 half-precision binary floating-point format has three fields, namely a 1-bit sign field, a 5-bit exponent field, and an 11-bit significand field. For the 11-bit significand field, 10 of the 11 bits are explicitly stored and one of the 11 bits is an inherent or implicit bit as is known. For the sign field, a binary 0 bit means the number is positive, and a binary 1 bit means the number is negative.

For the exponent field, width of the exponent can be up to 5 bits. However, the encoding of a floating-point exponent for IEEE 754 half-precision binary floating-point format includes an offset-binary representation. An offset-binary or excess-K digital coding simply means that an all binary zeroes representation (e.g., 00000 or 0) corresponds to a minimum negative value that can be represented and an all binary ones representation (e.g., 11111 or 31) corresponds to a maximum positive value that can be represented. For IEEE 754 half-precision binary floating-point format, there is a zero offset of 15, namely an exponent bias. Therefore, to obtain an actual exponent, an offset of 15 may be subtracted from a stored exponent. For example, if a stored exponent value is 15, then an actual exponent value is zero.

For the significand (or mantissa) field, precision is 11 bits though such field is a 10-bit field. Along those lines, there is an implicit lead bit with a value of a binary 1, unless the exponent field is stored with all zeros. So though 10 bits of a significand field may appear in a memory format, significand precision is 11 bits. This implicit lead bit may be thought of generally as a binary one above a binary point. In decimal notation, this may be thought of as a 1 immediately to the left of the decimal point, or more generally a radix point. In other words, in half-precision binary floating-point format, a range of mantissas is 1.0000000000 to 1.1111111111 for normalized numbers, where the leading binary 1 is an implicit bit. In other words, in a normalized floating-point value for a significand, there is always an implicit value of 1 to the left of the radix point. Therefore, to store a significand in a half-precision binary floating-point format, only bits to the right of the binary point may be stored. Also, for a normalized floating-point value for a significand, there are no leading zeroes in the significand; however, subnormal numbers may be used in IEEE 754 half-precision binary floating-point format.

Additionally, for IEEE 754 half-precision binary floating-point format, there are some exception codes or values. If all exponent bits are set to binary 1s (i.e., 11111) and the significand has a value of zero (i.e., 0000000000), then the value represented is +/−infinity depending on the sign bit. If all exponent bits are set to binary 1s and the significand has a nonzero value, then this represents a "not a number" ("NaN") state. For example, zero divided by zero, square root of a negative number, and a logarithm of a negative number are some examples of NaN states. If all exponent bits are set to binary zeros (i.e., 00000) and the significand has a value of zero, then the value represented is +/−zero depending on the sign bit. If all exponent bits are set to binary zeros and the significand has a nonzero value, then the value represented is a subnormal or denormal number.

Denormal, or denormalized, numbers, called subnormal numbers for IEEE 754, may be used to fill an underfill gap around zero for floating-point operations. Generally, any nonzero number having a magnitude smaller than the smallest normalized number is a subnormal number. In short, when designing a circuit or a program using floating-point values, such as to perform half-precision binary floating-point operations, filters may be used to check for exception codes or values.

In the past, range reduction was used to produce an exponential part of a result of an exponential function. Range reduction may involve using two constant coefficient multipliers in series. As is well known, binary multipliers generally are complex circuits using binary adders to add partial products. In addition to circuitry overhead associated with a series of multipliers, having progressive addition of partial products through such a series of multipliers adds latency to such circuitry.

Described below are circuit implementations for an exponential calculation function, e(x), for half-precision formatted numbers. More particularly, the following description is for circuit implementations for IEEE 754 half-precision binary floating-point formatted numbers. However, the scope of the following description is not limited to only IEEE 754 half-precision binary floating-point format, as such description is applicable to other types of half-precision floating-point binary formats.

Circuit implementations for half-precision formatted numbers described hereinbelow are more efficient, namely use less circuitry, than conventional half-precision implementations which are effectively scaled-down variants of single-precision implementations by use of range reduction. Along those lines, circuit implementations described below do not use range reduction. Avoidance of range reduction as described below may result in less circuitry overhead and less latency.

Along those lines, an exponent part of a result may be obtained by direct lookup. Range of half-precision is sufficiently restricted to allow for direct lookup of an initial exponent result, as described herein. Optional additional reductions in circuitry overhead and/or latency may be obtained, as described herein by selection of a point at which a fixed point representation of an input value is spliced for partial products. This selection may be used to reduce bit widths for early partial product determinations, which may further be used to reduce normalization, generally at the end of such circuit, to a single bit.

With the above general understanding borne in mind, various configurations for circuit implementations for an exponential calculation function for half-precision formatted numbers are generally described below.

Figures 1, 2:
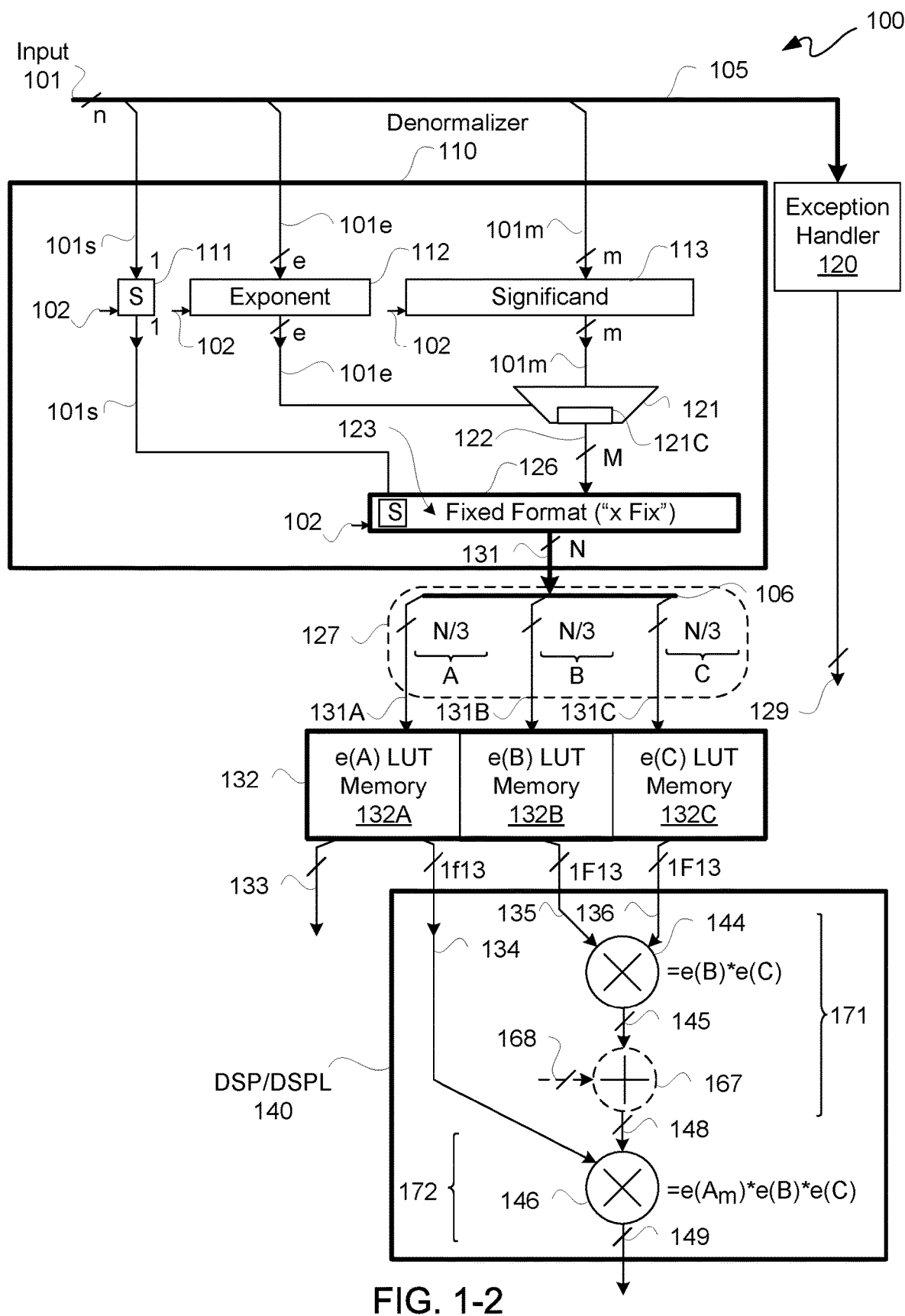
Figures 1, 2, 3:
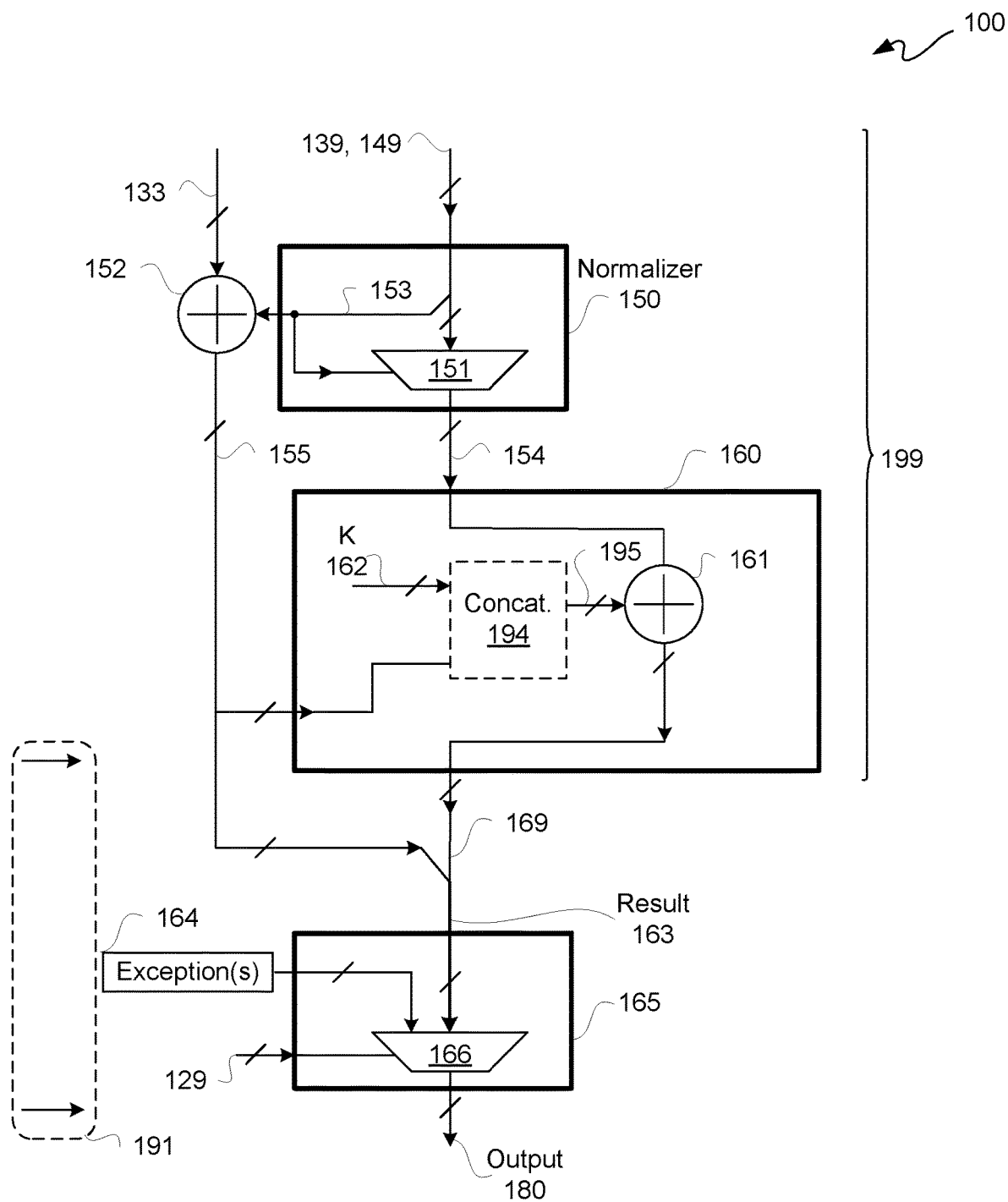
Figures 1, 2:
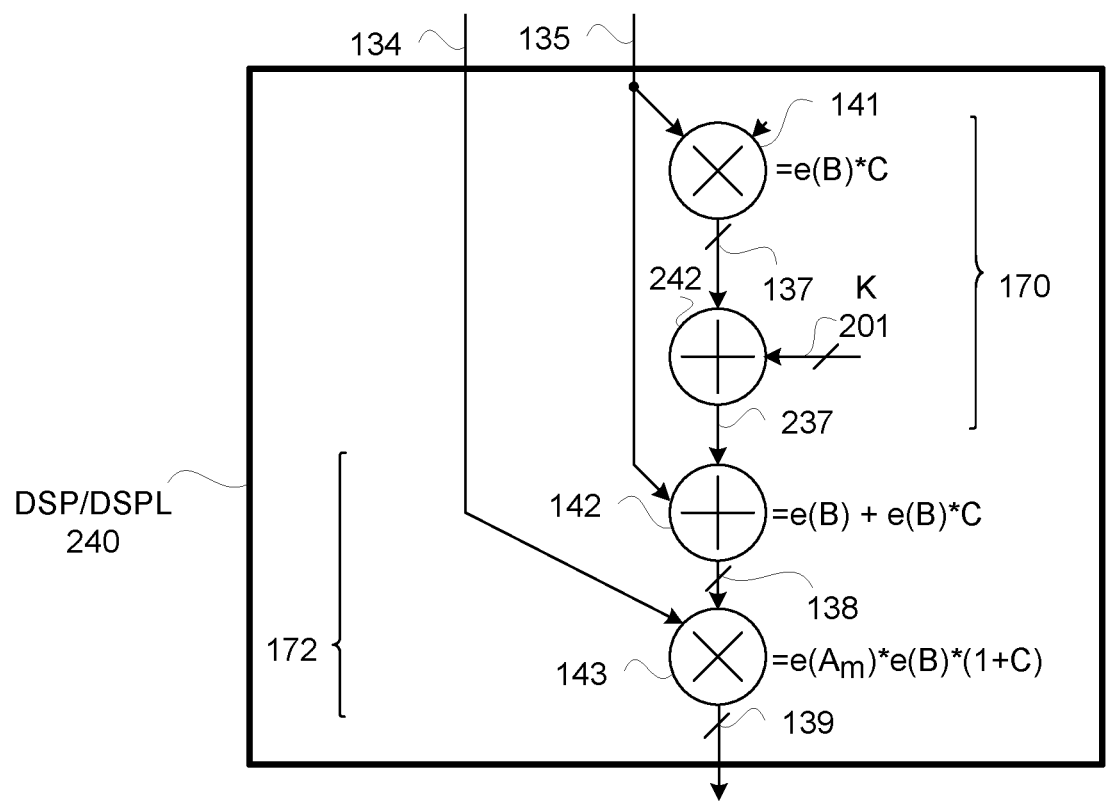
Figure 2:
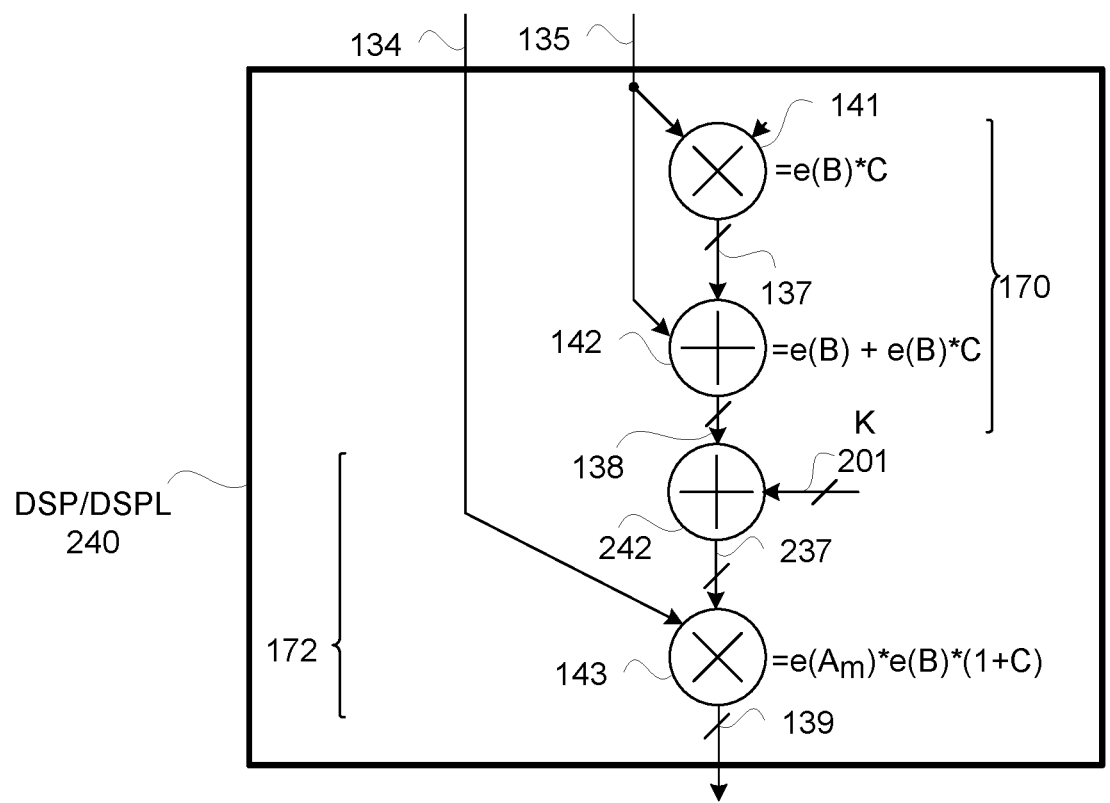
Figures 1, 3:
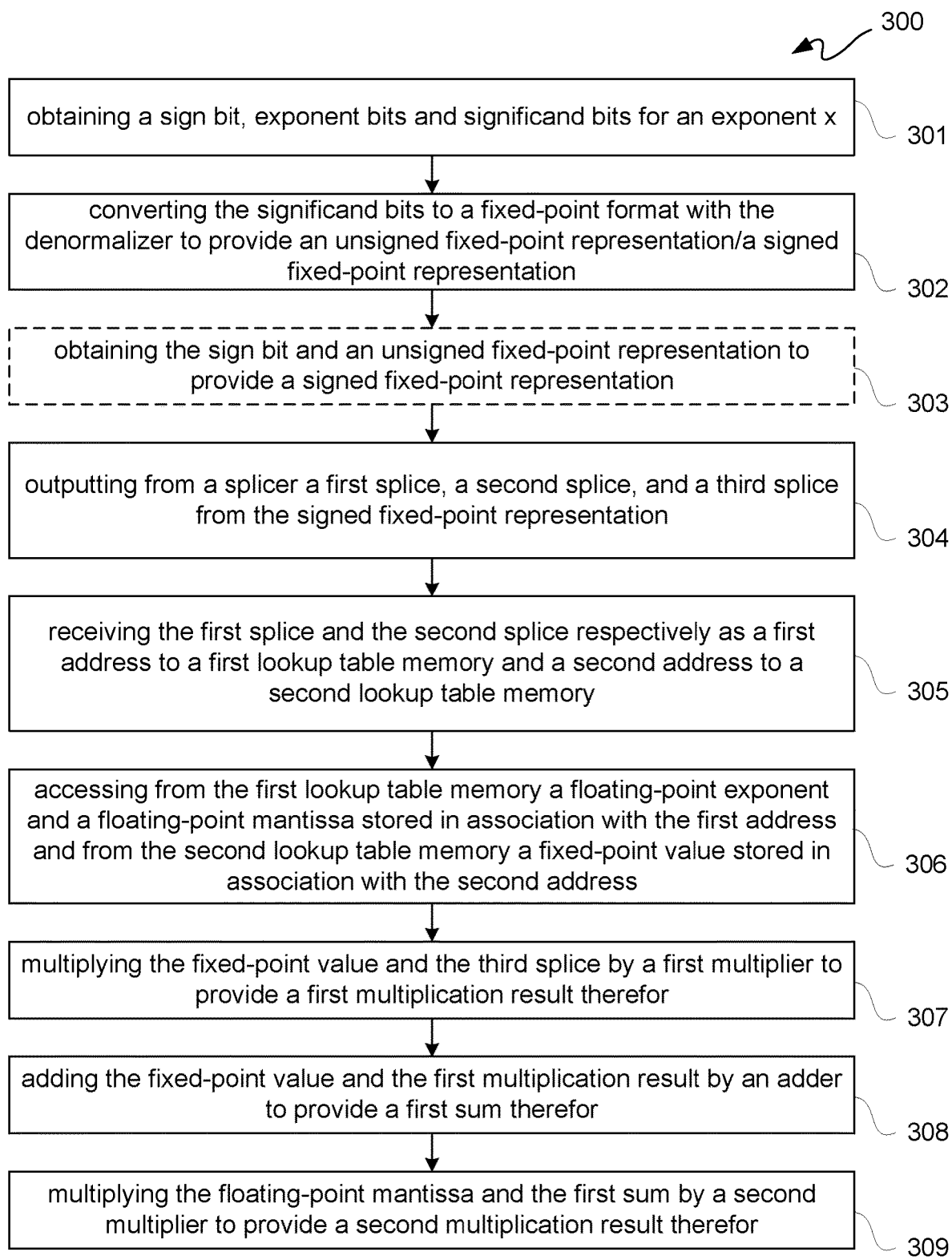
Figures 2, 3:
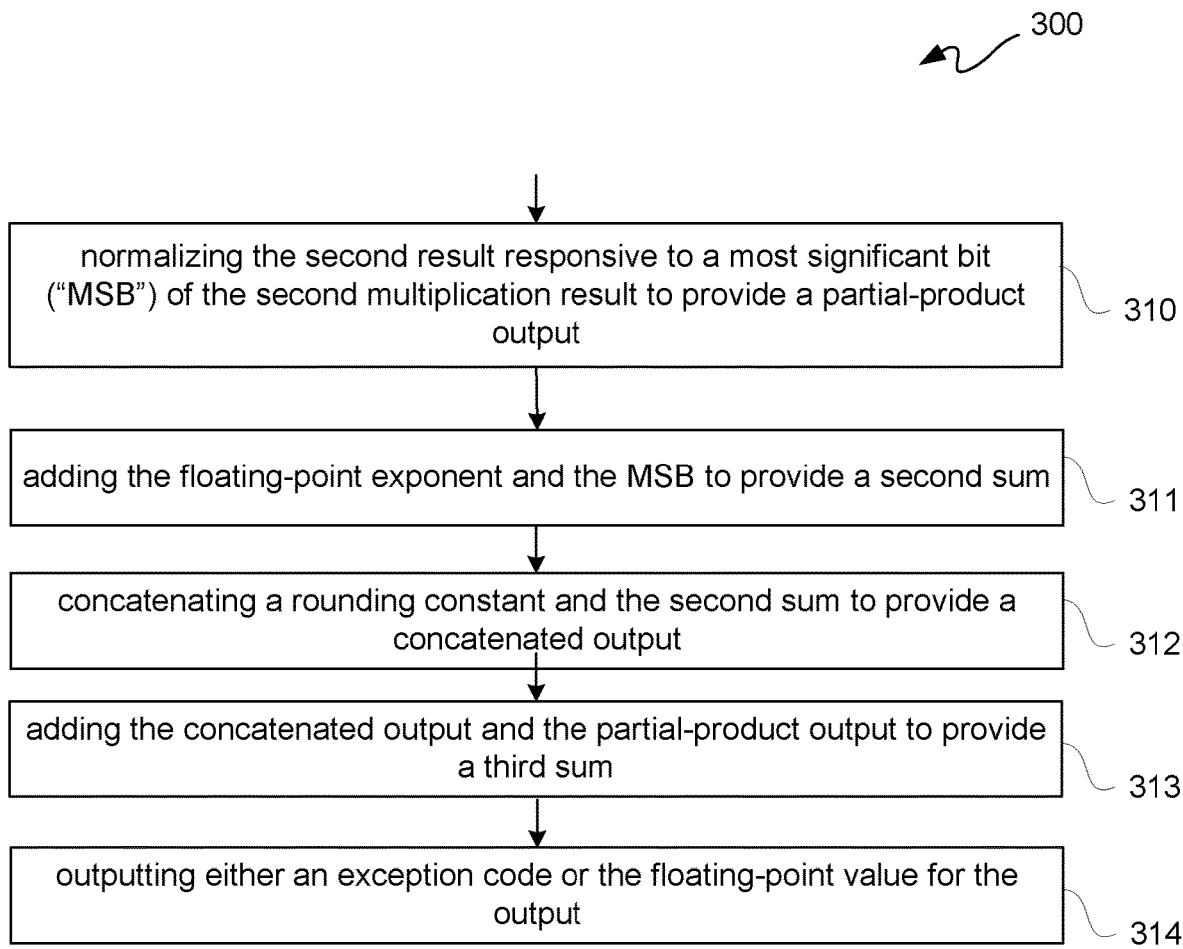

FIGS. 1-1 and 1-3 in combination is a block diagram depicting an exemplary exponential operator circuit 100, and FIGS. 1-2 and 1-3 in combination is a block diagram depicting another exemplary exponential operator circuit 100. With simultaneous reference to FIGS. 1-1 through 1-3, example implementations of exponential operator circuits 100 are further described.

An exponential operator is a mathematical exponential function of a form y equal to e^x for an exponent x, namely for e raised to a power x. Both an input x 101 to and an output y 180 from exponential operator circuit 100 may be represented in a half-precision floating-point format for x a variable, as described hereinbelow. For purposes of clarity by way of example and not limitation, it shall be assumed that both input x 101 and output y 180 are for an IEEE 754 half-precision format, as previously described, though other types of half-precision formats may be used in accordance with the following description.

With reference to FIGS. 1-1 and 1-3, an input x 101, which may be a bounded variable for outputting a floating-point value therefor, is input to a denormalizer circuit ("denormalizer") 110 and an exception handler 120 of exponential operator circuit 100. Thus, both denormalizer 110 and exception handler 120 may be coupled to receive a sign bit, exponent bits and significand bits for an exponent x. Exception handler 120 may be implemented with sets of bit-by-bit compare logic 128 to compare input x 101 with preset bit representations for exceptions, namely preset states for sign, exponent, and/or significand bit states in accordance with an IEEE 754 half-precision format predefined states such as previously described.

Preset outputs responsive to such preset bit representations may be one or more registered and/or hardwired exceptions 164 in an IEEE 754 half-precision format, and such exceptions 164 may be a data input to an output multiplexer 166 of an output selector 165. Exception handler 120 may provide a control-select signal 129 to output multiplexer 166 to select which, if any, of exceptions 164 to provide as output y 180. As with conventional approaches, special values (e.g., NaN, infinities, and zero) and values outside a half-precision expressible range may be detected by exception handler 120 in parallel to main exponential operator circuitry processing for selection at an output multiplexer 166. As exception handling for an IEEE 754 half-precision format is well known, exception handler 120 and exceptions 164 are not described in unnecessary detail for purposes of clarity and not limitation.

With reference to FIGS. 1-1 and 1-2, a denormalizer 110 may include registers 111 through 113, multiplexer 121, and register 126. Denormalizer 110 may be coupled to receive a sign bit, exponent bits and significand bits of a half-precision format IEEE 754 formatted input x 101, for an exponent x. Input x 101 may be n-bits wide for n a positive integer used for a half-precision format with sign ("s"), exponent ("e") and significand ("m", also known as mantissa) bits respectively indicated as a sign signal 101s, an exponent signal 101e, and a mantissa signal 101m. For purposes of clarity by way of example and not limitation, it shall be assumed that input x 101 includes a total of 16 bits, namely one sign bit for sign signal 101s, five exponent bits for exponent signal 101e, and 10 significand bits for mantissa signal 101m.

Input x 101 may be bussed onto a data bus 105 for input to both exception handler 120 and denormalizer 110. From data bus 105, an input sign signal 101s, exponent signal 101e and mantissa signal 101m may be respectively spliced or tapped out for respective input to a sign bit register ("S") 111, an exponent bits register 112, and a significand bits register 113. Registers 111 through 113 of denormalizer 110 may be clocked with a clock signal 102 for pipelined operation to output a sign bit of sign signal 101s, exponent bits of exponent signal 101e, and significand bits of mantissa signal 101m. Registers 111 through 113 are for three splices of an input, but registers 111 through 113 may be used for pipelining and delay balancing. However, there is neither a persistent state nor feedback, so in another implementation registers 111 through 113 may be omitted. Exponent signal 101e and sign signal 101s respectively output from registers 112 and 111 may be provided as a control-select signal input to multiplexer 121, and mantissa signal 101m output from register 113 may be provided as a data input to multiplexer 121. Even though a multiplexer 121 is illustratively depicted, a shift register or other circuitry may be used in accordance with the description herein to cause a shift of bits as described herein, whether such shift is caused by shifting and/or selecting.

Multiplexer 121 may be configured to convert significand bits of mantissa signal 101m into a fixed-point format for fixed-point signal 122. Fixed-point signal 122 output from multiplexer 121 may be M bits wide for M a positive integer. For purposes of clarity by way of example and not limitation, it shall be assumed that M in this example is 39 bits wide for reasons described hereinbelow; however, other values may be used depending on a precision to be implemented. Thus, fewer or more than 39 bits may be used in other implementations.

Fixed-point signal 122 output from multiplexer 121 may provide fixed-point representation responsive to selection responsive to exponent bits of exponent signal 101e of a fixed-point representation of significand bits of mantissa signal 101m. This conversion to a fixed-point format may be performed without binary weights, namely this conversion is not to be confused with a conventional range reduction. A sign bit of sign signal 101s may be provided as a multiplexer control select bit to multiplexer 121 in addition to exponent signal 101e bits, where multiplexer 121 is configured to either perform or not perform a 2's complement on such fixed-point representation. In an implementation, an unsigned fixed-point representation is made using mantissa bits as multiplexer data inputs and exponent bits as select lines inputs. Following a multiplexer output or interim output, there is complementer circuitry 121C which converts such unsigned fixed-point representation into a signed fixed-point representation, which may or may not be 2's complemented depending on state of a sign bit 101s. For convenience of description, such complementer circuitry 121C is incorporated into a multiplexer 121, but complementer circuitry 121C may be coupled externally to a multiplexer 121, or between denormalizer 110 and splicer 127. In pseudo code, this complementer circuitry 121 may be represented as:

If (sign==0) {//i.e. positive
Signed_rep=unsigned_rep;
} else {
Signed_rep=0-unsigned rep;
}

Technically, for this implementation, an extra bit does appear in a signed result, but not by "concatenation" as such. Such extra bit comes from having an unsigned number in the range 0 to $2^N-1$ (e.g., for N=3, the range is 0 to 7), so a further bit is used to represent this using a signed representation, as the range of a 2's complement binary number is $-2^{(M-1)}$ to $+2^{(M-1)}-1$ (e.g., for M=4, the range is −8 to +7), where M equals N+1). In another implementation, the above-listed pseudo code could cast unsigned_rep values to a signed_rep type. This operation would have caused a zero to be pre-pended to an unsigned representation (conventionally 0=positive).

For example, if a fixed-point representation is 4 bits long and held the value 9, namely 1001, then with a sign bit of sign signal 101s equal to a binary 0, this fixed-point representation after a sign extension becomes 01001; however, with a sign bit of a sign signal 101s equal to a binary 1, this fixed-point representation with sign extension becomes −9, namely 10111. In this implementation, sign extension is provided with registers 126, and multiplexer 121 provides a fixed-point signal 122 output without a sign extension but with either a 2's complement or not responsive to state of a sign bit of sign signal 101s.

Fixed-point signal 122 output from multiplexer 122 may be input to register 126 for storing with a sign bit of sign signal 101s output from register 111 for pipelined operation. Such sign bit and fixed-point significant bits may be stored in a fixed format ("x Fix") in register 126 effective with a fixed radix point, which for purposes of clarity is generally depicted as binary point 123. In another implementation, x Fix may not be stored in a register 126. Generally, arrows 191 of FIGS. 1-1 and 1-3 indicate suggested locations for registers for pipelining opportunities for an FPGA implementation. Accordingly, for exception handling, a same number of register stages may be used as in a main exponent processing path. However, this is just one example implementation of many possible configurations of register stages, and accordingly other implementations may be used.

In an implementation, exponential operator circuit 100 may be implemented in an FPGA, ASIC, ASSP, DSP, or other VLSI device. Moreover, exponential operator circuit 100 may include additional registers (not shown for purposes of clarity) downstream of register 126 for pipelined operation.

Any of significand bits in mantissa signal 101m may effectively be shifted rightwards or leftwards of a fixed binary point 123 depending on or responsive to exponent bits of exponent signal 101e. In other words, a half-precision floating point formatted input signal 101 may be converted into a fixed-point formatted number by denormalizer 110. This conversion may be performed by selecting or shifting a significand or mantissa portion of a half-precision floating point formatted input number according to a value of an exponent thereof.

Continuing the above example of a 39 bit wide output fixed-point signal 122 from multiplexer 121 for a half-precision formatted input, an exponent x may be between −14 and +14 inclusive to cover both positive and negative numbers within a half-precision range. In other words, for a dynamic range of −14 to +14 (i.e., $+/-2^{14}$), there are 14 bit positions above a fixed binary point 123 and 14 bit positions below a fixed binary point 123. For example, any of mantissa bits in mantissa signal 101m may be shifted or selected 14 positions to the left or right. The description herein assumes both positive and negative values are used, as described below in additional detail. However, in another implementation positive-only or negative-only numbers may be used.

A signed fixed-point representation for this example stored in register 126 may be 40 bits wide, namely 11 bit positions for significand bits (10 significand or mantissa bits input and an implicit bit as previously described) with 14 positive and 14 negative selectable bit positions left and right thereof, as well as a leading a sign bit. However, the majority of these 40-bit fixed format values would yield a result which would cause either an underflow or an overflow condition if converted to a half-precision format. For example, $e^{-14}$ and $e^{14}$ respectively are underflow and overflow conditions, namely out of an output range for a half-precision format. However, dynamic range for exponential operator processing may temporarily include these bit positions for reasons of accuracy of result.

From such a wide dynamic range, a narrower fixed-point range may be used to obtain a half-precision formatted result in accordance with the following description. This reduction in fixed-point range allows for a corresponding reduction of a signed fixed-point representation output from register 126.

Along those lines, a signed fixed-point reduced range word or value signal 131 output from register 126 may be N bits wide, for N a positive integer substantially less than M. In this example, a fixed-point dynamic range of approximately −9 to +11 may be used to yield results in a range which can be faithfully described in a half-precision format. Along those lines, for values outside of such a fixed-point dynamic range of approximately −9 to +11, exception handler 120 may have compare logic 128 configured to check for values of exponent x provided as input x 101 which exceed either a positive or negative threshold therefor. In an implementation, such fixed-point dynamic range for e(x) is for x a variable in a range from approximately −9.7 to 10.4, inclusive. This range for a variable x is for outputting a floating-point value for e(x); otherwise, an exception handler may output a predetermined value for a variable x outside of such range.

In this example, a reduction in a fixed-point representation down to the 18th least significant bit ("LSB") is used, namely a "top" 18 bits. In this example, for these 18 most significant bits ("MSBs"), 5 of such MSBs are above or to the left of fixed binary point 123, and 13 of such 18 MSBs are immediately to the right of fixed binary point 123. Such an 18-bit word or value signal 131 output from register 126 may be provided to a data bus 106 of splicer circuit ("splicer") 127 for splicing. Even though an 18-bit precision is used, fewer or more bits may be used depending on precision to be implemented. Moreover, even though 6-bit splices are used in this example for such 18-bit precision, in other implementations fewer or more than 6-bits per slice may be used. Additionally, even though in this example all splices are the same bit width for an FPGA implementation, in another FPGA or other type of implementation, some or none of such splices may have the same bit width. Furthermore, even though three splices are used in this example implementation, in another implementation fewer or more than three splices may be used.

Splicer 127, which may be implemented with signal routing traces, programmable interconnect points and/or a combination thereof, may be coupled to receive a sign bit of exponent x input to register 126 along with a reduced range fixed-point representation of bits as an N-bit word or value signal 131 *t* sign-extended fix-point representation, or more particularly a reduced-range sign-extended fixed point representation, from denormalizer 110. Optionally, splicer 127 may be configured for sign extension of a sign bit and a reduced-range fixed point representation.

Splicer 127 may be configured to output two or more splices depending on precision. In this example, splicer 127 is configured to output three splices A through C from data bus 106 as splice signals 131A through 131C, respectively, spliced from a reduced-range sign-extended fixed point representation obtained from denormalizer 110 as an N-bit word or value signal 131. In this example, an N-bit word 131 of a fixed-point representation of input x is evenly split without changing sequence of bits thereof into three 6-bit splices A through C, respectively. In this example, splice A includes a sign bit and the five highest MSBs of such an N-bit word, such five highest MSBs are to the left of fixed binary point 123; splice B includes the next six MSBs, such six MSBs are the first six MSBs immediately to the right of fixed binary point 123 of such an N-bit word; and splice C includes the last 6 MSBs starting 7 bit positions below or to the right of fixed binary point 123 of such an N-bit word.

Splicer 127 may be coupled to one or more memories 132, and such one or more memories 132 may include two or more lookup table ("LUT") memories. Such one or more memories may be read-only memories or other type of memories capable of being configured as one or more lookup tables. With continued reference to FIG. 1-1, a lookup table memory 132A may be coupled to receive splice signal 131A as an address or index into lookup table memory 132A for accessing a floating-point exponent, which may be output as floating-point exponent signal 133, and a floating-point mantissa value, which may be output as floating-point mantissa signal 134, stored in association with one another and accessible with or responsive to such address. In general terms for this example, floating-point exponent and mantissa values for e^A, where A is a 6-bit value from splice signal 131A, may be stored together in lookup table memory 132A. Along those lines, a floating-point exponent and mantissa value pair may be stored in lookup table memory 132A for each possible value of A, which in this example is a 6-bit value for A, for e^A or e(A). In this example, floating-point value signal 134 for a predetermined mantissa value for e(A) is a 14 bit output, namely a 1 bit position above or left of a floating binary point and 13 bit positions below or right of the floating binary point, namely "1f13".

Floating-point exponent signal 133 for a predetermined exponent value for e(A) may be a 14 bit output, namely a 1 bit position above or left of a floating binary point and 13 bit positions below or right of the floating binary point, namely "1f13". However, a floating-point exponent may be encoded with an offset-binary representation and stored in lookup table memory 132A. For IEEE 754 half-precision, this offset-binary representation may include a zero offset of 15. Thus, for example rather than outputting a 1 for a floating-point exponent, a value of 16 may be output, namely 1+15. By storing exponent values with such an offset-binary representation, this avoids having an extra adder add such a bias value to an output to conform to IEEE 754. However, in another implementation, an adder may be used to add a binary offset or bias to a result prior to output without storing floating-point exponent values with such a binary offset.

A lookup table memory 132B may be coupled to receive splice signal 131B as an address or index into lookup table memory 132B for accessing a fixed-point value, which may be output as fixed-point value signal 135, stored in association with or responsive to such address. In general terms for this example, a fixed-point value e^B, where B is a 6-bit value from splice signal 131B, is stored in lookup table memory 132B. Along those lines, a fixed-point value for e^B may be stored in lookup table memory 132B for each possible 6-bit value B.

With additional reference to FIG. 1-2, a lookup table memory 132C of one or more memories 132 may be coupled to receive splice signal 131C as an address or index into lookup table memory 132C for accessing a fixed-point value, which may be output as fixed-point value signal 136, stored in association with such address. In general terms for this example, a fixed-point value e^C, where C is a 6-bit value from splice signal 131C, is stored in lookup table memory 132C. Along those lines, a fixed-point value for e^C may be stored in lookup table memory 132C for each possible 6-bit value B.

For example, all 6-bit values for A, B and C cover a dynamic range of −9 to +11 by determining all results for e^A, e^B and e^C, respectively, in advance, and then these predetermined values for e^A, e^B and e^C may be respectively stored in lookup table memories 132A, 132B and 132C. Again, because an exponent part of an input value is already effectively range restricted due to representation of an output in a half-precision format, a direct or "raw" lookup of an initial exponent result may be used, and conventional "range reduction" may be avoided. To further reduce resource overhead and latency, selection of one or more locations where a fixed-point representation or description of an input value may be spliced prior to generation of partial products may be used to reduce bit widths, which in this example are three 6-bit splices.

Reduced bit widths may be used to have predetermined values stored for early calculations of an exponential operator process, as bit widths may be manageable sizes for determining and storing exponent calculation results, such as for e^A and e^B, or e^A, e^B and e^C, as early exponential operator or function calculation results. Moreover, use of splices may reduce normalization to a half-precision format at a later stage of an exponential operator process, which reduction may allow for normalization to be reduced to application of a single bit as described below in additional detail.

To further clarify the usefulness of using splices, a full number in fixed-point format may have so many bits that a direct lookup of an exponential function may have a prohibitively large memory overhead cost. In contrast, by splitting a fixed-point number into splices, memory requirements for lookups of splices may be considerably smaller. This is because the cost of binary memory for a lookup is 2 to the power of the number of bits. For example, an 18 bit number, the number of memory locations for a lookup table may be 2^18. However, if such direct or "raw" lookup is broken out into two or three splices as in the examples herein, then the number of memory locations for a lookup table may respectively be two or three instances of 2^6, and or more multipliers, as described herein.

Along those lines, circuits used to solve an exponential function may use the mathematical property that e(x+y)=e(x) e(y), e(x+y+z)=e(x) e(y) e(z), and so on. As described herein, an input number is converted to a fixed-precision number, and then exponential values of individual splices of such fixed-precision number are looked up in memory. These exponential values may then be multiplied together to yield a final exponential result using such mathematical property.

With renewed reference to FIG. 1-1, because values output from memory 132C for e^C or e(C) may not be very significant with respect to an overall result for a half-precision format, memory 132C may be omitted in favor of using an approximation. Again, recall that splice C starts at a $7^{th}$ bit position to the right of the binary point in this example, and so determining e(C) may be approximated for a half-precision format.

Along those lines, a Taylor Series expansion of e(x) may have higher order terms with magnitudes too small to be expressed in half precision format for values in a third splice, such as splice C starting at a $7^{th}$ bit position to the right of a fixed binary point in this example. This is just one example; however, generally a lowest bit position slice value may have an exponent therefor approximated.

Hence, an approximation of a Taylor Series for e(x) may be used by dropping such higher order terms, namely e(x) may be approximated as 1+x. This approximation may be used to avoid a lookup by just adding 1 to C, as e(C) need not be used. Along those lines, for a fixed-point reduced range word or value signal 131, x may have exponent calculated therefor as e(x)=e(A)*e(B)*(1+C) for A, B and C splice values, where effectively a number of trivial partial products may be avoided by not multiplying e(B) with e(C). In other words, multiplication conventionally is performed in a multiplier by multiple additions of partial products. This equation may be implemented by first adding 1 to C, and then multiplying. However, in the example implementation, this equation is implemented as e(A)*[e(B)+e(B) C] in FIG. 1-1, as described below in additional detail.

A fixed-point value signal 135 for a predetermined value for e^B or e(B) for a splice B output from lookup table memory 132B and a fixed-point value for a splice C output via splice signal 131C are input to multiplier 141 to provide a first partial product result output from multiplier 141 as partial product signal 137. Because splice B does not include bits to the left of a fixed binary point, a range of outputs of fixed-point values for fixed-point value signal 135 is limited as B is limited from 0 to 0.5, inclusive. In other words, e(B) for B in a range of 0 to 0.5 means that no exponent need be used to describe fixed-point values for e(B). This means that fewer bits, as well as no separate exponent need be implemented, for output from lookup table memory 132B.

Partial product signal 137 may provide a first partial product result as an input to adder 142, and adder 142 may be further coupled to receive a fixed-point value signal 135 for a predetermined value for e(B) for a splice B. Adder 142 may add e(B) from fixed-point value signal 135 and a first partial product result output of partial product signal 137 to provide a second partial product result or sum output from adder 142 as partial product signal 138. Again, multiplication of e(B)*(1+C) can be rephrased as e(B)+e(B)*C, namely a multiplication and then an addition.

In this example, fixed-point value signal 135 for a predetermined value for e(B) is a 14 bit output, namely a 1 bit position above or left of a fixed binary point and 13 bit positions below or right of the fixed binary point, namely "1F13". In other words, this fixed-point value format output from memory 132B is a particularized form of a floating-point format. Even though a 14 bit output is used fewer or more bits than 14 may be used in other implementations. For this example implementation, there are three guard bits, namely three more bits than the minimum number of 11 bits specified for half-precision format.

By using C directly, which in this example is a 6-bit value, then a smaller multiplication, namely a 14×6 multiply, may be used rather than using two quantities of at least 11-bits each for a minimal half precision format. Thus, for this example, bit width of an output of multiplier 141 may be 20 bits. Moreover, a 14×14 multiply may use more circuit resources and thus more power than a 14×6 multiply followed by an add operation.

Partial product signal 138 and a floating-point value signal 134 for a predetermined value for e^A or e(A) for a splice A output from lookup table memory 132A are input to multiplier 143 to provide a third partial product result output from multiplier 143 as partial product signal 139. However, memory 132A in contrast to memory 132B may be configured to store a floating-point format of mantissa and exponent for predetermined values of e(A) stored therein. Thus, for a lookup of a splice A of a splice signal 131A in memory 132A, a floating-point formatted exponent value may be output via exponent signal 133, and a floating-point formatted mantissa may be output via floating-point value signal 134.

Partial product signal 139 output from multiplier 143 may thus be a result of $e(A_m)$ e(B) (1+C), where $e(A_m)$ is a predetermined mantissa value for e(A). Such mantissa value is in a range of 1 to 2, inclusive. When such mantissa value $e(A_m)$ is multiplied by a result of e(B)(1+C), then a range of partial product signal 139 may be a value from 1 to 4, inclusive. Along those lines, normalization using only a single bit may be used to yield a mantissa value in the range of 1 to 2, inclusive. Along those lines, a normalization circuit may be configured to detect whether a leading binary one of output of a final multiplication stage 172, namely output from multiplier 143 in this example, is in one of two positions corresponding to a result in either the range 1 to 2 or 2 to 4. For detection of a leading binary one corresponding to the range 2 to 4, an exponent result of exponent signal 133 output from a lookup of splice A is incremented by such normalization circuit using only one bit to provide a final exponent result. For detection of a leading binary one corresponding to the range 1 to 2, an exponent result of exponent signal 133 output from a lookup of splice A is left unchanged, namely not incremented, by such normalization circuit to provide a final exponent result. An example implementation of a normalization circuit is described below in additional detail.

Multiplier 141 and adder 142 may be part of a first multiplier stage 170, and multiplier 143 may be part of a second multiplier stage 172. Multiplier stages 170 and 172 may be implemented with a DSP or a series of DSPLs in a digital signal processing circuit 140. An implementation of a DSPL may be in an FPGA, as described hereinbelow, where a DSPL may include a multiplier and at least one adder.

With reference to FIG. 1-2, fixed-point value signals 135 and 136, each of which may be a 1F13 formatted signal, may be input to a multiplier 144 of a first multiplier stage 171 of a digital signal processing circuit 140. Multiplier 144 may multiply fixed point values respectively of fixed-point value signals 135 and 136 to provide a first partial product result via partial product signal 145 output from multiplier 144. In this example for multiplication of two 14-bit inputs, partial product signal 145 may be 28 bits wide.

To reduce input width of such partial product signal 145, an optional adder 167 coupled to receive a rounding constant 168 may be coupled between multipliers 144 and 146 for rounding and truncating a partial product signal 145 input thereto to provide a truncated partial product signal 148 to multiplier 146. Thus, for example the LSB of partial product signal 148 may be rounded, with bits below the LSB being discarded, so for example only the top number of MSBs may be passed downstream. For purposes of clarity by way of example and not limitation, it shall be assumed that truncated partial product signal 148 is 14 bits wide, namely the top 14 MSBs, though other bit widths may be used in accordance with the description herein.

A partial product of partial product signal 148 and a floating-point mantissa value of floating-point mantissa signal 134 are respectively input to multiplier 146 for multiplication thereof to produce a partial product result for partial product signal 149 output from multiplier 146 of second multiplication stage 172. Again, multiplication stages 171 and 172 may be with a DSP or a series of DSPLs in a digital signal processing circuit 140. For the example of a 14-bit wide partial product signal 148 and a 14-bit wide floating-point mantissa signal 134, a partial product result output from multiplier 146 as partial product signal 149 may be a 28-bit wide output.

As 11 bits plus 3 guard bits are used for both operands input to multiplier 146, a 1 unit in the last place or unit of least precision ("ulp") accuracy may be obtained. However, a multiplier of an FPGA may handle operands of larger bit widths, so more guard bits may be used for greater accuracy, such as approximately ½ ulp. Conversely, fewer than 3 guard bits on either or both operands may be used, though accuracy other than 1 ulp may be obtained in such an implementation. A partial product signal 139 or 149 output as described for the exemplary implementations yields a mantissa in the range 1 to 4, inclusive. This partial product result may be normalized and rounded, where an exponent of such result is either a value read as such exponent of e(A) or one more than such value, depending on whether the mantissa was in the range 1 to 2 or 2 to 4.

Partial product signal 149 output from multiplier 146 may thus be a result of $e(A_m)$ $e(B)$ $e(C)$, where $e(A_m)$ is a predetermined mantissa value for e(A). Again, such mantissa value is in a range of 1 to 2, inclusive. When such mantissa value $e(A_m)$ is multiplied by a result of e(B)e(C), then a range of partial product signal 149 may be a value from 1 to 4, inclusive. Along those lines, normalization using only a single bit may be used to yield a mantissa value in the range of 1 to 2, inclusive. Along those lines, a normalization circuit may be configured to detect whether a leading binary one of output of a final multiplication stage 172, namely output from multiplier 146 in this example, is in one of two positions corresponding to a result in either the range 1 to 2 or 2 to 4. For detection of a leading binary one corresponding to the range 2 to 4, an exponent result of exponent signal 133 output from a lookup of splice A is incremented by such normalization circuit using only one bit to provide a final exponent result. For detection of a leading binary one corresponding to the range 1 to 2, an exponent result of exponent signal 133 output from a lookup of splice A is left unchanged, namely not incremented, by such normalization circuit to provide a final exponent result.

Further with reference to FIG. 1-1, split of splices A and B means that less memory may be used for a two memory implementation or two memory space implementation than without using splices as previously described. In other implementations, more splices than two may be used so even less overall memory space is used, but at a cost of additional multiplications, namely additional multipliers. However, use of more splices may reduce normalization overhead. To reduce normalization overhead with only two splices, selection of span of splices may be used. By having splice B begin one bit below the binary point for a range of 0 to 0.5, range of results for e(B) may be constrained from 1 to a number or decimal value less than 2, inclusive, which in this example is from 1 to approximately 1.648 or approximately 1.669, i.e. a range of less than a factor of 2. If B was to begin at a higher bit position, the possible range of values of e(B) would span more than a single factor of 2, so additional stages of normalization would be implemented to handle an exponent value for e(B). However, by having e(B) outcomes constrained to a number less than two, then no exponent value for e(B) is present.

With reference to FIG. 1-3, a normalizer circuit ("normalizer") 150 may be coupled to receive a floating-point mantissa portion of a result for e(x), namely partial product signal 139 or 149. The top bit or the MSB of partial product signal 139 or 149 may be tapped or bit stripped off for input as a control-select signal or MSB signal 153 to multiplexer 151 of normalizer 150, as well as an input to adder 152. Another input to adder 152 may be a floating-point exponent value from floating-point exponent signal 133.

Continuing the above example, partial product signals 139 and 149 may each be 28 bits wide. Along those lines, in another implementation, such signals may be input to an adder for addition with a rounding constant K before normalizing, where such rounding constant may effectively be 0.5 of the least significant mantissa decimal value. Output of such adder may truncate bits for a half-precision format, as described herein. By rounding and truncating prior to normalizing, a narrower multiplexer 151 may be used for normalization. Because rounding then normalizing, or normalizing then rounding, may be used, such operations may generally be considered for processing an interim result 199. However, for purposes of clarity by way of example and not limitation, it shall be assumed that normalization is performed before rounding, as described hereinbelow.

A data input to multiplexer 151 is partial product signal 139 or 149, which includes the MSB of MSB signal 153 too. Multiplexer 151 is configured to detect a leading binary one of partial product signal 139 or 149 corresponding to the range 1 to 2 using the MSB provided as control select signal 153.

In other words, if a partial product result of partial product signal 139 or 149 is greater than 2, then the exponent is in the proper location, which for this example such MSB would have a value of a binary 1. Accordingly, a multiplexer 151 outputs such partial product result without any selection shifting thereof for a leading binary 1. Thus, all bits of such partial product are not shifted up one position to provide normalized partial product output 154 from multiplexer 151. If, however, a partial product result of partial product signal 139 or 149 is in a range of 1 to 2, inclusive, then the exponent is not in the proper location, as indicated by the MSB being a binary 0. Accordingly, multiplexer 151 outputs such a partial product result with a selection shifting thereof to normalize such partial product result, such as for an IEEE 754 half-precision format. Thus, all bits of such partial product are shifted up one position to provide normalized floating-point partial product output 154 of a mantissa portion from multiplexer 151. It should be understood that a multiplier output may be wider than a half-precision format, and so normalization and rounding as described herein may be used to strip a leading 1 and otherwise put a mantissa portion of a floating-point value to be output in a half-precision format, such as for IEEE 754.

If a partial product result may be shifted by multiplexer 151, then for a floating-point exponent value of floating-point exponent signal 133, an adaptation may be performed to account for a possible shift. Along those lines, if there is no shift of mantissa bits, a binary 1 of MSB signal 153 is added by adder 152 to such floating-point exponent to provide a floating-point normalized exponent portion, namely sum 155 output from adder 152, for a result of e(x) in a half-precision format. If there is a shift of mantissa bits, a binary 0 of MSB signal 153 is added by adder 152 to such floating point exponent to provide a floating-point normalized exponent portion, namely sum 155 output from adder 152, for a result of e(x) in a half-precision format. Along those lines, adder 152 may optionally be included as part of normalizer 150, but is separated out for purposes of clarity and not limitation.

To round a normalized result of a floating-point mantissa portion, if not previously rounded, normalized floating-point partial product output 154 may be input to an adder 161 of a round-off or round circuit 160. A concatenation circuit 194 of round-off circuit 160 may be coupled to receive a rounding constant K 162 and sum 155. As a mantissa floating-point portion, namely normalized floating-point partial product output 154, may be just less than 2, and rounding to sum 169 might cause an overflow to 2 due to rounding, optionally a floating-point normalized exponent portion, namely sum 155, may be concatenated starting from the end bit of constant K 162, such as by wiring in concatenation circuit 194. This concatenated output 195 from concatenation circuit 194 may be provided as an input to adder 161 for addition with normalized floating-point partial product output 154. Along those lines, if an overflow does occur, such a floating-point normalized exponent portion may be incremented causing a mantissa portion thereof to become zero. This may avoid a further detection for an overflow condition, which may avoid adding latency for such detection.

Output of sum 169 may be with LSBs below a threshold LSB truncated or otherwise restricted to a half-precision format by round-off circuit 160. Round-off circuit 160 may be used to restrict output of such a mantissa portion 169 of a floating-point value to an IEEE 754 half-precision format. For IEEE 754 half-precision format, only 11 bits, including a leading one, may be represented.

A normalized exponent portion of sum 155 may be wire concatenated with a mantissa portion 169 output from round-off circuit 160 to provide a normalized result 163 for e(x) in a half-precision format. Normalized result 163 may be a data input to a multiplexer 166 of an output selector circuit 165. A register file or other storage device 164 may store one or more exception codes ("exceptions"), such as for an IEEE 754 half-precision format. Storage device 164 may be coupled to multiplexer 166 to provide such one or more exceptions as one or more other data inputs to multiplexer 166. Control-select signal 129 may be provided as a control-select input to multiplexer 166 for selecting either an exception in storage device 164 or a result 163 as an output 180 therefrom.

With reference to FIG. 2-1, where there is shown a schematic diagram depicting another digital signal processing circuit 240, such as may be used in the exemplary exponential operator circuit 100 of FIG. 1-1 to replace the digital signal processing circuit 140 thereof. As much of the description of digital signal processing circuits 140 and 240 is the same, such same description is generally not repeated below for purposes of clarity and not limitation.

A partial product result output via partial product signal 137 from multiplier 141 may be input to an adder 242 of a first multiplier stage 170. Another input to adder 242 may be a rounding constant K 201. Rounding constant K 201 may be added to one or more LSBs of such a partial product result output via partial product signal 137 by adder 242 to round such result, and one or more LSBs output from a sum via sum signal 237 output from adder 242 may be truncated to limit or reduce the number of bits input to adder 142. Continuing the above example of a 14-bit and a 6-bit input to multiplier 141 to provide a 20 bit output, width of output of adder 242 may be truncated to 15 bits, including a carry bit. Thus, output of adder 142 may likewise be 14 bits plus a carry bit, and multiplier 143 may perform a 14×14 multiplication.

With reference to FIG. 2-2, where there is shown a schematic diagram depicting yet another digital signal processing circuit 240, such as may be used in the exemplary exponential operator circuit 100 of FIG. 1-1 to replace the digital signal processing circuit 140 thereof. As much of the description of digital signal processing circuits 140 and 240 is the same, such same description is generally not repeated below for purposes of clarity and not limitation.

A sum output via partial product signal 138 from adder 142 of a first multiplier stage 170 may be input to an adder 242 of a second multiplier stage 172. Another input to adder 242 may be a rounding constant K 201. Rounding constant K 201 may be added to one or more LSBs of such a sum via partial product signal 138 by adder 242 to round such sum, and one or more LSBs output from a sum via sum signal 237 as output from adder 242 may be truncated to limit or reduce the number of bits input to multiplier 143. Continuing the above example of a 14-bit and a 6-bit input to multiplier 141 to provide a 20 bit output to and from adder 142, width of output of adder 242 may be truncated to 15 bits, including a carry bit. Thus, output of adder 242 may likewise be 14 bits plus a carry bit, and multiplier 143 may perform a 14×14 multiplication.

FIGS. 3-1 and 3-2 in combination is a flow diagram depicting an exemplary exponential function determination flow 300 for an exponential function of a form e^x for an exponent x in a half-precision floating-point format for x a variable. Exponential function determination flow 300 is for the exemplary exponential operator circuit 100, such as previously described with reference to FIGS. 1-1 and 1-3.

At 301, a sign bit 101$s$, exponent bits 101$e$ and significand bits 101$m$ may be separately obtained by splicing or bit stripping such bits from an exponent x input 101. A sign bit 101$s$, exponent bits 101$e$ and significand bits 101 may be spliced out for respective inputs to a denormalizer 110. At 302, significand bits 101$m$ may be converted to a fixed-point format with denormalizer 110 to provide either a signed fixed-point representation responsive to such a sign bit 101$s$ and exponent bits 101$e$, or such fixed-point representation unsigned responsive to exponent bits 101$e$. A sign bit 101$s$ may be used to either perform or not a 2's complement on such fixed-point representation, as previously described, prior to signing. Optionally, at 303, a sign bit 101$s$ of such exponent x and an unsigned fixed-point representation may be obtained by a complementer 121C to provide a complemented or uncomplemented signed extension thereof, namely to provide a signed fixed-point representation. However, for purposes of clarity by way of example and not limitation, it shall be assumed that a denormalizer 110 is configured to complement or not and sign such fixed-point representation.

At 304, a first splice A, a second splice B, and a third splice C may be output from slicer 127 from a signed fixed-point representation, such as output by a denormalizer 110 for example. At 305, first splice A and second splice B may be respectively received as a first address to a first lookup table memory 132A and a second address to a second lookup table memory 132B. At 306, accessed may be: a floating-point exponent and a floating-point mantissa stored in first lookup table memory 132A in association with such first address; and a fixed-point value stored in second lookup table memory 132B in association with such second address. At 307, such fixed-point value and such third splice may be multiplied by a first multiplier 141 to provide a first multiplication result therefor. At 308, such fixed-point value and such first multiplication result may be added by an adder 142 to provide a first sum therefor. At 309, such floating-point mantissa and such first sum may be multiplied by a second multiplier 143 to provide a second result therefor.

At 310, such second multiplication result may be normalized responsive to the MSB of such second multiplication result. At 311, such a floating-point exponent and the MSB of such second multiplication result may be added to provide a second sum.

At 312, a rounding constant and such a second sum may be concatenated, such as by a concatenation circuit 194 as previously described, to provide a concatenated representation or output. At 313, such a concatenated output and such a partial-product output may be added to provide a third sum. Such a third sum and such a second sum respectively may be a mantissa portion and an exponent portion of a floating-point value for such an exponent x in a half-precision floating-point format.

Concatenation of exponent and mantissa portions may be performed before rounding so that in the event that rounding should tip a mantissa of 0.1111111111 to 1.0000000000, the leading 1 will add to the exponent (i.e., which has been concatenated above the bits indicated) and the mantissa will become 0. If the original number was 0.1111111111*2^0 and rounding tipped it over, it would be have an all zero mantissa (i.e., 0.0000000000 and an exponent of 1=2, which is the correct result. If rounding is performed before concatenation of exponent and mantissa portions, circuitry may be implemented to detect and account for this "corner" event. However, by performing concatenation before rounding, an adder carry-chain performs this exception handling correctly for such a "corner" event. In this or another implementation, order of normalization and rounding operations, generally respectively at 310 and 313, may be reversed. At 314, either an exception code or the floating-point value may be selected for the output.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 4:
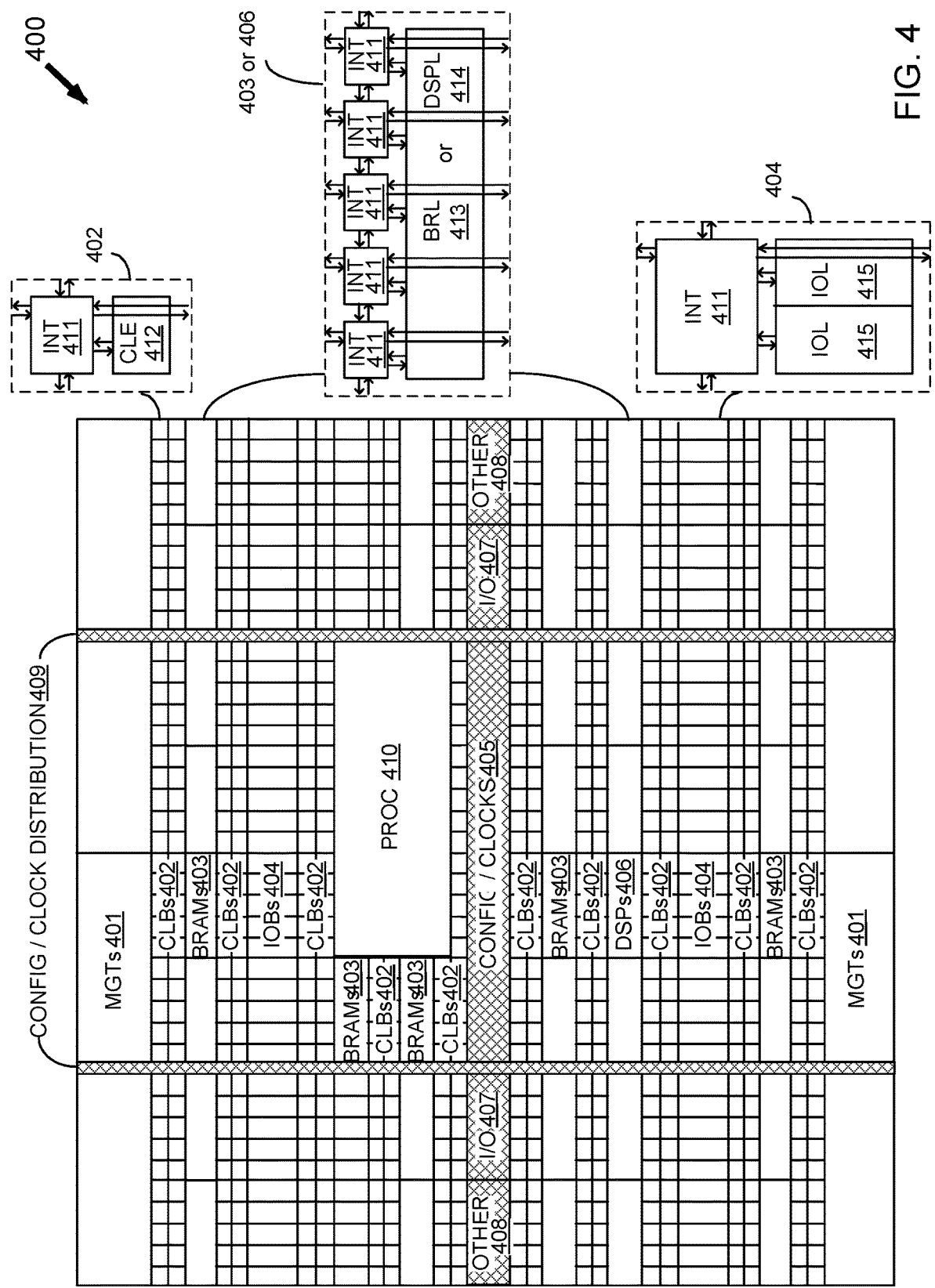
FIG. 4 is a simplified block diagram depicting an exemplary columnar Field Programmable Gate Array ("FPGA") architecture.

As noted above, advanced FPGAs can include several different types of programmable logic blocks in the array. For example, FIG. 4 illustrates an FPGA architecture 400 that includes a large number of different programmable tiles including multi-gigabit transceivers ("MGTs") 401, configurable logic blocks ("CLBs") 402, random access memory blocks ("BRAMs") 403, input/output blocks ("IOBs") 404, configuration and clocking logic ("CONFIG/CLOCKS") 405, digital signal processing blocks ("DSPs") 406, specialized input/output blocks ("I/O") 407 (e.g., configuration ports and clock ports), and other programmable logic 408 such as digital clock managers, analog-to-digital converters, system monitoring logic, and so forth. Some FPGAs also include dedicated processor blocks ("PROC") 410.

In some FPGAs, each programmable tile includes a programmable interconnect element ("INT") 411 having standardized connections to and from a corresponding interconnect element in each adjacent tile. Therefore, the programmable interconnect elements taken together implement the programmable interconnect structure for the illustrated FPGA. The programmable interconnect element 411 also includes the connections to and from the programmable logic element within the same tile, as shown by the examples included at the top of FIG. 4.

For example, a CLB 402 can include a configurable logic element ("CLE") 412 that can be programmed to implement user logic plus a single programmable interconnect element ("INT") 411. A BRAM 403 can include a BRAM logic element ("BRL") 413 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element ("DSPL") 414 in addition to an appropriate number of programmable interconnect elements. An IOB 404 can include, for example, two instances of an input/output logic element ("IOL") 415 in addition to one instance of the programmable interconnect element 411. As will be clear to those of skill in the art, the actual I/O pads connected, for example, to the I/O logic element 415 typically are not confined to the area of the input/output logic element 415.

In the pictured embodiment, a horizontal area near the center of the die (shown in FIG. 4) is used for configuration, clock, and other control logic. Vertical columns 409 extending from this horizontal area or column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, processor block 410 spans several columns of CLBs and BRAMs.

Note that FIG. 4 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 4 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus for evaluating an exponential function of a form $e^x$ for an exponent x in a half-precision floating-point format for x a variable, the apparatus comprising:
a denormalizer circuit ("denormalizer") configured to receive a sign bit, exponent bits and significand bits for the exponent x and to convert the significand bits to a fixed-point format to provide a signed fixed-point representation;
a splicer circuit ("splicer") coupled to the denormalizer circuit and configured to receive the signed fixed-point representation and output a first splice, a second splice, and a third splice from the signed fixed-point representation;
a first lookup table memory coupled to the splicer and configured to receive the first splice as a first address and to access a floating-point exponent and a floating-point mantissa responsive to the first address;
a second lookup table memory coupled to the splicer and configured to receive the second splice as a second address and access a fixed-point exponent value responsive to the second address;
a first multiplier configured to receive the fixed-point exponent value and the third splice and provide a first multiplication result;
an adder configured to receive the fixed-point exponent value and the first multiplication result and provide a sum; and
a second multiplier configured to receive the floating-point mantissa and the sum and provide a second multiplication result, wherein a combination of the floating-point exponent and the second multiplication result is a floating-point value.

2. The apparatus according to claim 1, wherein the adder and the sum respectively are a first adder and a first sum, the apparatus further comprising:
a normalizer circuit ("normalizer") configured to receive the second multiplication result as a data input, the normalizer configured to: tap a most significant bit ("MSB") of the second multiplication result, and select a mantissa portion of the exponential function responsive to the MSB; and
a second adder configured to receive the floating-point exponent and the MSB to provide a second sum as an exponent portion of the exponential function.

3. The apparatus according to claim 1, wherein:
the exponential function is a first exponential function;
the floating-point exponent and the floating-point mantissa are stored in the first lookup table memory for a second exponential function of a form $e^A$ for A being the first splice; and
the fixed-point exponent value is stored in the second lookup table memory for a third exponential function of a form $e^B$ for B being the second splice.

4. The apparatus according to claim 3, wherein
the signed fixed-point representation includes a binary point; and
the second splice is started one bit position below the binary point.

5. The apparatus according to claim 4, wherein the fixed-point exponent value is a value B for $e^B$ being bound from 1 to a decimal value less than 2, inclusive.

6. The apparatus according to claim 3, wherein the floating-point exponent is encoded with an offset-binary representation.

7. The apparatus according to claim 1, wherein the denormalizer is configured to:
receive the significand bits as a data input and the sign bit and the exponent bits as a control-select input;
select output positions for the significand bits responsive to the exponent bits to convert the significand bits from the half-precision floating-point format to the fixed-point format to provide the signed fixed-point representation; and
determine whether to perform a 2's complement on the signed fixed-point representation responsive to the sign bit.

8. The apparatus according to claim 1, wherein the denormalizer includes a multiplexer configured to:
receive the significand bits as a data input and the sign bit and the exponent bits as a control-select input;
select output positions for the significand bits to effect a shift of the significand bits by a binary value of the exponent bits to provide the signed fixed-point representation; and
perform a 2's complement on the signed fixed-point representation responsive to the sign bit being a binary 1.

9. The apparatus according to claim 8, wherein the multiplexer is configured to cause the shift of the significand bits as a leftwards shift or a rightwards shift responsive to the binary value of the exponent bits being positive or negative, respectively.

10. The apparatus according to claim 1, wherein:
the first splice consists of the sign bit and a first portion of the signed fixed-point representation;
the second splice consists of a second portion of the signed fixed-point representation exclusive of the first splice for all of the second portion below the first portion; and
the third splice consists of a third portion of the signed fixed-point representation exclusive of the first splice and the second splice for the entirety of the third portion below the second portion.

11. The apparatus according to claim 1, further comprising an exception handler configured to receive the sign bit, the exponent bits and significand bits for the exponent x.

12. The apparatus according to claim 11, further comprising a multiplexer configured to:
receive the floating-point value and a control-select input from the exception handler; and
select either the floating-point value or an exception code for output therefrom responsive to the control-select input.

13. The apparatus according to claim 1, further comprising a round-off circuit configured to:
receive the floating-point value;
add a rounding constant to the floating-point value; and
restrict output of the floating-point value rounded to an IEEE 754 half-precision format.

14. The apparatus according to claim 1, wherein the variable x is in a range of −9.7 to 10.4 to output the floating-point value.

15. An apparatus for evaluating an exponential function of a form e^x for an exponent x in a half-precision floating-point format for x a variable, the apparatus comprising:
a denormalizer circuit ("denormalizer") configured to receive a sign bit, exponent bits and significand bits for the exponent x and convert the significand bits to a fixed-point format to provide a signed fixed-point representation;
a splicer circuit ("splicer") coupled to the denormalizer circuit and configured to receive the signed fixed-point representation and output a first splice, a second splice, and a third splice from the signed fixed-point representation;
a first lookup table memory coupled to the splicer circuit and configured to receive the first splice as a first address and access a floating-point exponent and a floating-point mantissa responsive to the first address;
a second lookup table memory coupled to the splicer circuit and configured to receive the second splice as a second address and access a first fixed-point value responsive to the second address;
a third lookup table memory coupled to the splicer circuit and configured to receive the third splice as a third address and access a second fixed-point value responsive to the third address;
a first multiplier configured to receive the first fixed-point value and the second fixed-point value and provide a first multiplication result; and
a second multiplier configured to receive the floating-point mantissa and the first multiplication result and provide a second multiplication result, wherein a combination of the floating-point exponent and the second multiplication result is a floating-point value.

16. The apparatus according to claim 15, further comprising:
a normalizer circuit ("normalizer") configured to:
receive the second multiplication result as a data input;
tap a most significant bit ("MSB") of the second multiplication result; and
select a mantissa portion of the exponential function for the exponent x in the half-precision floating-point format responsive to the MSB; and
an adder configured to receive the floating-point exponent and the MSB to provide a sum as an exponent portion of the exponential function for the exponent x in the half-precision floating-point format.

17. The apparatus according to claim 15, wherein the variable x is in a range of −9.7 to 10.4 to output the floating-point value.

18. A method for evaluating an exponential function of a form e^x for an exponent x in a half-precision floating-point format for x a variable, the method comprising:
obtaining a sign bit, exponent bits, and significand bits by bit stripping the exponent x for input to a denormalizer circuit ("denormalizer");
converting the significand bits to a fixed-point format with the denormalizer to provide a signed fixed-point representation responsive to the sign bit and the exponent bits;
outputting from a splicer circuit ("splicer") a first splice, a second splice, and a third splice from the signed fixed-point representation;
receiving the first splice and the second splice respectively as a first address to a first lookup table memory and a second address to a second lookup table memory;
accessing a floating-point exponent and a floating-point mantissa from the first lookup table memory responsive to the first address;
accessing a fixed-point value from the second lookup table memory responsive to the second address;
multiplying the fixed-point value and the third splice by a first multiplier to provide a first multiplication result;
adding the fixed-point value and the first multiplication result by an adder to provide a first sum;
multiplying the floating-point mantissa and the first sum by a second multiplier to provide a second multiplication result;
normalizing the second multiplication result responsive to a most significant bit ("MSB") of the second multiplication result to provide a partial-product output; and
adding the floating-point exponent and the MSB to provide a second sum.

19. The method according to claim 18, further comprising:
concatenating a rounding constant and the second sum to provide a concatenated output; and
adding the concatenated output and the partial-product output to provide a third sum, the third sum and the second sum respectively being a mantissa portion and an exponent portion of a floating-point value for the exponent x in the half-precision floating-point format.

20. The method according to claim 19, further comprising selecting either an exception code or the floating-point value for the output, wherein the variable x is in a range of −9.7 to 10.4 to output the floating-point value.

* * * * *